UNITED STATES PATENT OFFICE.

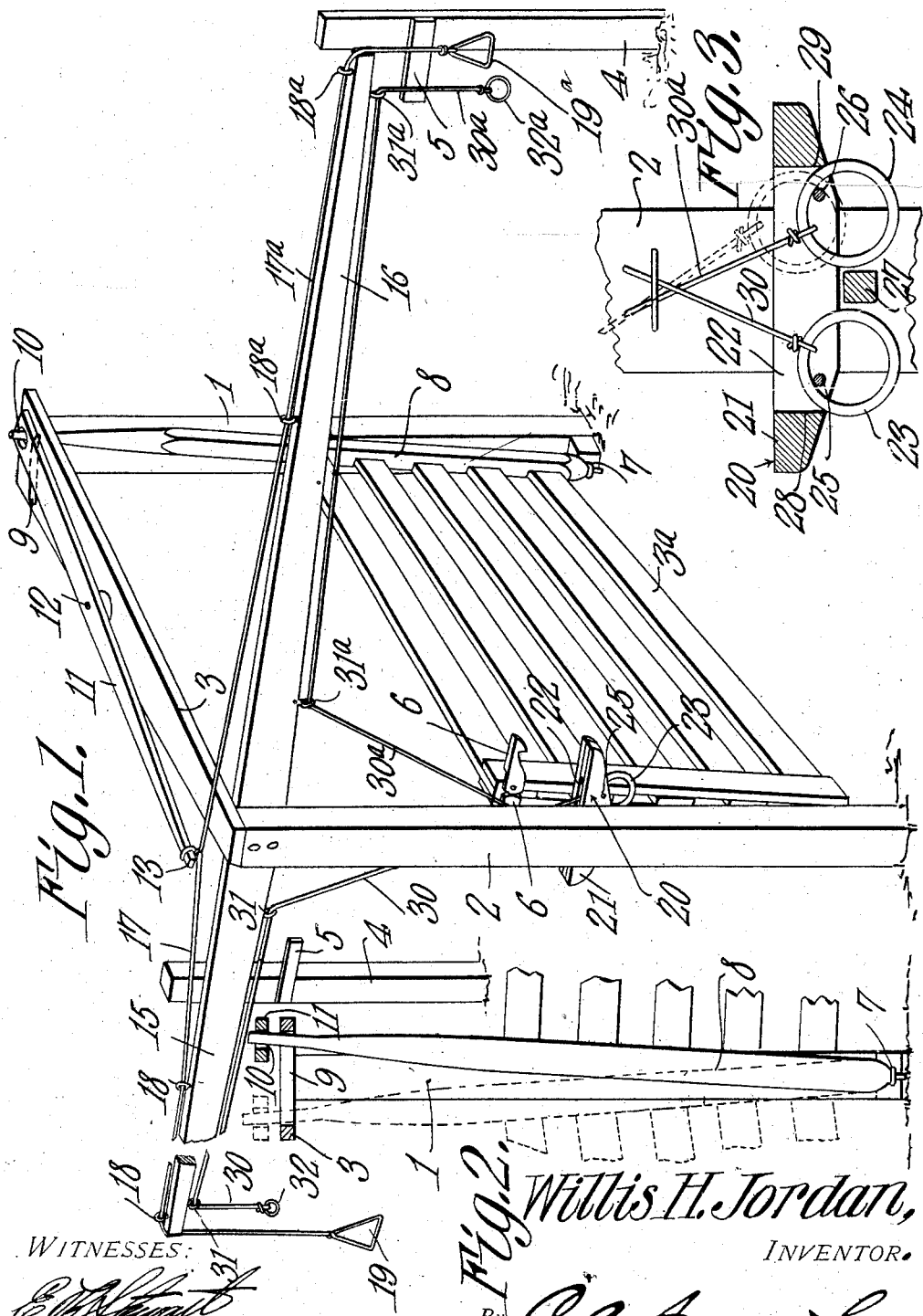

WILLIS HAMMELTON JORDAN, OF ROGERS PRAIRIE, TEXAS.

GATE.

No. 866,139.   Specification of Letters Patent.   Patented Sept. 17, 1907.

Application filed April 2, 1907. Serial No. 365,960.

*To all whom it may concern:*

Be it known that I, WILLIS HAMMELTON JORDAN, a citizen of the United States, residing at Rogers Prairie, in the county of Leon and State of Texas, have invented a new and useful Gate, of which the following is a specification.

This invention relates to farm gates of the horizontally swinging type which may be opened and closed from either side of the gate upon approaching or departing therefrom without the inconvenience of descending from a vehicle or horse.

The object of the invention is to provide a farm gate with a simple, inexpensive and positively actuating mechanism, by means of which the gate may be caused to swing open and shut by gravity from either side, and at any desired distance from the gate; to provide a simple latch and means for operating the same whereby the gate is prevented from swinging towards the person entering; to provide means for changing the poise of the gate; and for certain other combinations and arrangement of parts hereinafter described and claimed.

In the accompanying drawing:—Figure 1 is a perspective view of the gate closed. Fig. 2 is an elevation of the hinge post showing the positions it assumes when out of poise, the gate rails being broken away. Fig. 3 is a detail view of the latch.

Similar numerals of reference indicate the same parts on all the figures.

On opposite sides of a roadway are erected upright posts, 1 and 2, joined at their upper ends by a brace bar 3 rigidly attached to the posts. Between the posts 1 and 2 a gate 3ª swings, its extent of movement on either side when open being limited by a short post 4 and a keeper 5 thereon with which a hook 6, pivoted to the outer or swinging end of the gate engages to hold the gate open. There are two of these hooks 6, one on each side of the gate so that the gate will be held open irrespective of the direction in which it swings.

Attached to the upright post 1 near the ground is a step bearing 7 in which is seated the lower end of the pivot bar 8 of the gate. The pivot bar 8 extends above the gate and projects through a curved slot 9 in the brace bar 3 and is loosely connected at 10 to one end of a horizontally disposed lever 11, pivoted on a vertical pin 12, mounted on the top of said brace bar 3. The other end 13 of the lever 11 extends to a point above the upright post 2 where it is connected to suitable operating mechanism, hereinafter described, for throwing the pivot bar out of poise and thereby changing the center of gravity of the gate.

Bolted to the top of the post 2 are two horizontal arms 15 and 16, extending parallel to the roadway but in opposite directions from the post, and far enough from the gate to permit a vehicle to be driven up and the driver to reach the end of either arm. A rope, cable or chain 17 is fastened to the end 13 of the horizontal lever 11, and after passing through suitable guides, such as eye bolts 18, hangs down over the end of the arm 15, which may be provided with a pulley if desired. On the end of the rope 17 is a suitable hand grip 19 by means of which the rope is drawn downward and the lever 11 turned on its pivot. At the opposite side of the gate is a similar rope, cable or chain 17ª, guides 18ª and hand grip 19ª.

Fastened to the gate post 2 at some point below the level of the top of the gate 3ª is a latch 20, comprising a plate 21 having a central vertical slot 22 in which slot are placed two rings 23 and 24 supported on pins 25 and 26, respectively, passing through the rings. The slot 22 lies transversely of the gate when closed and is wide enough to permit the rings to move flatwise freely therein, as clearly shown in Fig. 3, and of sufficient length to leave room between the rings for the outwardly projecting latch finger 27, fastened on the front of the gate, to enter. By examining Fig. 3 it will be seen that when the gate closes from either direction, the latch finger 27 will strike one or the other latch ring 23—24, which will swing inwardly on its pin support and permit the latch finger 27 to pass, then drop again behind the latch finger. The pins 25—26 on which the latch rings 23—24 hang, are placed in such relation to the ends 28—29 of the slot 22, that the rings bind between their respective supporting pins and the adjacent end of the slot whenever the latch finger presses against a ring from the inside, and cannot be lifted; thus securely fastening the gate when closed.

The latch rings are raised to disengage the gate, by cords, or chains 30, 30ª, (see dotted lines in Fig. 3) attached respectively to the rings 23 and 24, which cross each other as they are carried up to guides 31, 31ª on the under side of the arms 15, 16, where, at the ends of said arms, the cords or chains terminate in rings 32—32ª for operating them.

With a gate constructed as described, if it be the desire of a person in a vehicle to pass, when approaching from the left, with the gate in the position represented in Fig. 1, it will only be necessary to pull the cord 30 and lift the latch ring 23, when the gate will swing open away from the vehicle, until stopped by the post 4; the hook 6, catching over the keeper 5, holding the gate open. This automatic movement of the gate is caused by the position of the pivot bar 8, which, it will be observed, leans in the direction in which the gate swings, thus throwing the preponderance of weight on that side of a vertical axis passing through the step bearing 7. After passing through the gate, the hand grip 19ª is seized by the driver and the rope 17ª pulled which being attached to the horizontal lever 11, turns it on its pivot carrying the end 10 with the upper end of the pivot bar 8 to the opposite side of the above mentioned vertical axis, as indicated by dotted lines in Fig. 2. This movement of the pivot post raises the front end of the gate sufficiently high to disengage the hook 6 from its keeper, and, as the center of gravity has been changed by this movement of the pivot bar, the gate will immediately close, the latch finger 27 raising the latch ring 23 and coming in contact with the latch ring 24. The movement of the gate will be arrested, but, owing to the inclination of the pivot bar 8, it will be ready to continue its swing to the open position on the opposite side as soon as the latch ring 24 is raised.

When approaching the gate from the right, with the position of the pivot bar inclined as in Fig. 1, if the cord 30ª be first pulled, it will elevate the latch ring 24, but as the weight of the gate is against the latch ring 23 because the pivot bar inclines to the right, the gate remains closed; it will therefore be necessary to first draw down the rope 17ª and throw the pivot bar to the opposite side, away from the person desiring to enter before the gate can be opened. From this it will readily be seen that it is impossible to open the gate towards an approaching vehicle, but must always be opened away from it.

It is to be understood that while the above description presents the invention in the best form known at the present time, certain changes in construction and arrangement of parts may be made without departing from the spirit of the invention.

Having thus described the invention what is claimed is:—

1. A swinging gate having a long pivot bar mounted in a bearing at its lower end and free at its upper end to be tilted on said bearing out of a vertical plane, a hinge post carrying said bearing, and a latch post, each post extending above said gate, a cross bar connecting the upper ends of said posts, a lever pivoted between its ends to said cross bar and having an opening therein for the upper end of said pivot bar, and means for swinging said lever to change the poise of the gate.

2. A swinging gate having a long pivot bar mounted in a bearing at its lower end and free at its upper end to be tilted on said bearing out of a vertical plane, a hinge post carrying said bearing, and a latch post, each post extending above said gate nearly to the top of the pivot bar, a cross bar connecting the upper ends of said posts and having a slot in one end, a lever pivoted between its ends to the upper side of said cross bar and having an opening for the upper end of the pivot bar which extends through said slot, and means attached to the opposite end of the lever and extending in different directions for swinging said lever to change the poise of the gate.

In testimony that I claim the foregoing as my own, I have hereto affixed my signature in the presence of two witnesses.

WILLIS HAMMELTON JORDAN.

Witnesses:
 P. B. SHANNON,
 I. M. ABBOTT.